(12) United States Patent (10) Patent No.: US 8,438,134 B2
Enbutsu et al. (45) Date of Patent: May 7, 2013

(54) COMPUTER-READABLE RECORDING MEDIUM CONTAINING DATABASE COPYING PROGRAM, AND DATABASE COPYING APPARATUS AND METHOD

(75) Inventors: Hisayuki Enbutsu, Kawasaki (JP); Masaru Araki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 896 days.

(21) Appl. No.: 11/449,998

(22) Filed: Jun. 9, 2006

(65) Prior Publication Data

US 2007/0220072 A1 Sep. 20, 2007

(30) Foreign Application Priority Data

Mar. 17, 2006 (JP) ................................. 2006-074529

(51) Int. Cl.
*G06F 7/00* (2006.01)
*G06F 17/00* (2006.01)

(52) U.S. Cl.
USPC ......................................................... 707/657

(58) Field of Classification Search .................. 707/204, 707/655, 657
See application file for complete search history.

(56) References Cited

U.S. PATENT DOCUMENTS

| | | | | |
|---|---|---|---|---|
| 5,740,433 A * | 4/1998 | Carr et al. | ...................... | 707/202 |
| 5,745,753 A * | 4/1998 | Mosher, Jr. | ................... | 707/202 |
| 5,900,883 A * | 5/1999 | Crucs | ........................... | 345/629 |
| 5,943,688 A * | 8/1999 | Fisher et al. | ................... | 711/162 |
| 6,226,651 B1 * | 5/2001 | Masuda et al. | ................ | 707/202 |
| 6,671,705 B1 * | 12/2003 | Duprey et al. | ................ | 707/204 |
| 7,433,903 B1 * | 10/2008 | Shapiro et al. | ................ | 707/204 |
| 2005/0033590 A1 * | 2/2005 | kaminsky et al. | ................. | 705/1 |
| 2005/0268188 A1 * | 12/2005 | Kawamura et al. | ........... | 714/723 |

FOREIGN PATENT DOCUMENTS

| | | |
|---|---|---|
| JP | 6-214853 | 8/1994 |
| JP | 2003-167684 | 6/2003 |
| JP | 2003-256255 A | 9/2003 |
| JP | 2004-303025 A | 10/2004 |
| JP | 2004-535638 A | 11/2004 |
| JP | 2005-078014 | 3/2005 |
| JP | 2005-339131 A | 12/2005 |
| WO | WO-03/003209 A1 | 1/2003 |

OTHER PUBLICATIONS

Jonas, "Flash Card memory Roundup 2005: Introduction", Apr. 1, 2005 available online: http://www.livedigitally.com/2005/04/01/flash-card-memory-roundup-2005-introduction/.*
Japanese Office Action, Partial English-language translation, mailed Feb. 1, 2011 for corresponding Japanese Application No. 2006-074529.

* cited by examiner

*Primary Examiner* — Brannon W Smith
(74) *Attorney, Agent, or Firm* — Fujitsu Patent Center

(57) ABSTRACT

A computer-readable recording medium containing a database copying program for making a copy of a database on a remote computer being connected over a network, without causing a delay in replying to an application program. A mirroring unit copies data written on a plurality of local disks onto corresponding remote disks in the same sequence as the data was written. Upon reception of a data writing request, a data writing unit stores the data in a local disk selected as a current disk. When the data stored in the current disk reaches a maximum data capacity, the current disk manager switches the current disk to another local disk. In addition, when the data stored in the current disk reaches the maximum data capacity, an operation information manager stores operation information requesting backup of the data stored in the current disk, in a local disk selected as an operation information storage disk.

4 Claims, 9 Drawing Sheets

130a

| OPERATION INFORMATION TABLE | | |
|---|---|---|
| ORDER OF USE | DISK NAME | STATE |
| 1 | RLC1 | FULL |
| 2 | RLC2 | IN-USE |
| 3 | RLC3 | FREE |

COMPUTER-READABLE RECORDING MEDIUM CONTAINING DATABASE COPYING PROGRAM, AND DATABASE COPYING APPARATUS AND METHOD

CROSS-REFERENCE TO RELATED APPLICATIONS

This application is based upon and claims the benefits of priority from the prior Japanese Patent Application No. 2006-074529, filed on Mar. 17, 2006, in Japan, the entire contents of which are incorporated herein by reference.

BACKGROUND OF THE INVENTION (1) Field of the Invention

This invention relates to a computer-readable recording medium containing a database copying program, and a database copying apparatus and method, for making a copy of a database. Especially, this invention relates to a computer-readable recording medium containing a database copying program, and a database copying apparatus and method, for making a copy of a database on a remote computer being connected over a network.

(2) Description of the Related Art

At present, computers are often used for various purposes, such as data processing in business. Therefore, loss of data in databases should be avoided. The databases may be copied in case computers storing the databases fail. By doing so, even when data stored in a usually used computer (hereinafter, referred to as host computer) is broken, the data can be recovered from the duplicate database. Especially, in case natural hazard or the like befalls and a host computer becomes unusable, for example, databases are copied on a computer at a distance (hereinafter, referred to as remote computer).

There are two methods for transferring data into a remote computer: a messaging method and a mirroring method. In the messaging method, a host computer explicitly transmits a message including data to software running on a remote computer. In the mirroring method, a middleware for managing the local disks of a host computer and the remote disks of a remote computer automatically copies data from the local disks onto the remote disks. There is such a middleware to be used in the mirroring method that holds a sequence of writing data between logical disks and makes a copy of the data on remote disks in this sequence (for example, refer to Japanese Unexamined Patent Publication No. 2003-167684). Use of such a dedicated middleware has an advantage in that data copy does not affect an application program running for data processing.

To recover data whenever a host computer fails, the databases (hereinafter, referred to as host databases) of the host computer and the duplicate databases (hereinafter, referred to as remote databases) of the remote computer should strictly maintain their consistency. The mirroring method causes a time lag between updates of original and duplicate databases. This cannot maintain strict consistency. To avoid this problem, the host computer may confirm whether a remote database has been updated every time when data is updated. Specifically, when the host computer updates a host database in response to a request from an application program, the host computer confirms that a remote database has been updated, and then returns a response of processing completion to the application program. This technique realizes simultaneous updates of both databases, however, has a drawback in that a response to the application program is delayed due to a network delay time and a time required for updating the remote database.

There is a known method in which only update data that is information on update of a host database is transmitted to a remote computer and the remote computer updates a corresponding remote database based on the update data later (for example, refer to Japanese Unexamined Patent Publication No. 6-214853). In this connection, the host computer transmits the update data to the remote computer when updating the host database. The remote computer keeps the received update data and acknowledges its reception to the host computer, rather than updating the remote database immediately. Then the remote computer updates the remote database upon reception of a request for reflecting the update data on the remote database from the host computer. This method allows the host computer to continue the processing when receiving the acknowledgement of update data reception from the remote computer. It takes a shorter time to reply to the application program. In addition, when the host computer fails, data can be recovered based on the remote database and the update data that has not been reflected on the remote database yet.

However, Japanese Patent Unexamined Publication No. 6-214853 has a drawback in that the host computer has to wait for the acknowledgement from the remote computer. Still a time to reply to the application program is required due to a network delay time. It is demanded that the host computer can reply to the application program when storing the update data in the local disk.

General networks cause a delay in message transmission, so that a first message may not arrive first. A timing of making a copy of update data from a local disk onto a remote disk and an arrival timing of a message requesting reflection of the update data at the remote computer cannot be controlled. Even if the host computer transmits a message requesting the reflection of the update data after storing the update data in the local disk, the message may arrive faster than the update data. If the message arrives first, the remote computer updates a remote database based on inappropriate update data. This causes discrepancy between the host database and the remote database. Therefore, the host computer has to wait for an acknowledgement from the remote computer before continuing the processing.

SUMMARY OF THE INVENTION

This invention has been made in view of foregoing and intends to a computer-readable recording medium containing a database copying program, and a database copying apparatus and method, which makes a copy of a database on a remote computer being connected over a network, without causing a delay in replaying to an application program.

To achieve the above objects, there is provided a computer-readable recording medium containing a database copying program for making a copy of a database on a remote computer being connected over a network. The database copying program contained causes a computer to perform as: a mirroring unit for, when data is written on a plurality of local disks individually, writing the duplicate data of the data on remote disks in the same sequence as the data was written, the remote disks provided in the remote computer to correspond to the plurality of local disks, respectively; a current disk manager for selecting one of the plurality of local disks as a current disk, and when the stored data of the current disk reaches a preset maximum data capacity, switching the current disk to another local disk; a data writing unit for, when a data writing request arrives, writing the data on the current disk; and an operation information manager for selecting one of the plurality of local disks as an operation information storage disk, and when the stored data of the current disk reaches the preset maximum data capacity, storing operation information requesting backup of the duplicate data of the data stored in the current disk, in the operation information storage disk.

Further, to achieve the above objects, there is provided a database copying apparatus for making a copy of a database on a remote computer being connected over a network. This database copying apparatus comprises: a mirroring unit for, when data is written on a plurality of local disks individually, writing the duplicate data of the data on remote disks in the same sequence as the data was written, the remote disks provided in the remote computer to correspond to the plurality of local disks, respectively; a current disk manager for selecting one of the plurality of local disks as a current disk, and when the stored data of the current disk reaches a preset maximum data capacity, switching the current disk to another local disk; a data writing unit for, when a data writing request arrives, writing the data on the current disk; and an operation information manager for selecting one of the plurality of local disks as an operation information storage disk, and when the stored data of the current disk reaches the preset maximum data capacity, storing operation information requesting backup of the duplicate data of the data stored in the current disk, in the operation information storage disk.

Still further, to achieve the above objects, there is provided a database copying method having a mirroring unit for, when data is written on a plurality of local disks individually, writing the duplicate data of the data on remote disks in the same sequence as the data was written, the remote disks provided in a remote computer to correspond to the plurality of local disks, respectively. In this database copying method, a data writing unit, when a data writing request arrives, writes the data on a local disk selected as a current disk out of the plurality of local disks, a current disk manager, when the stored data of the current disk having the data written thereon reaches a preset maximum data capacity, switches the current disk to another local disk, and an operation information manager, when the stored data of the current disk having the data written thereon reaches the preset maximum data capacity, stores operation information on a local disk selected as an operation information storage disk out of the plurality of local disks, the operation information requesting backup of the duplicate data of the data stored in the current disk.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 shows an example data structure of an operation information table.

DESCRIPTION OF THE PREFERRED EMBODIMENTS

A preferred embodiment of this invention will be described with reference to the accompanying drawings. This invention will be first summarized and a specific embodiment will be described.

Figure 1:
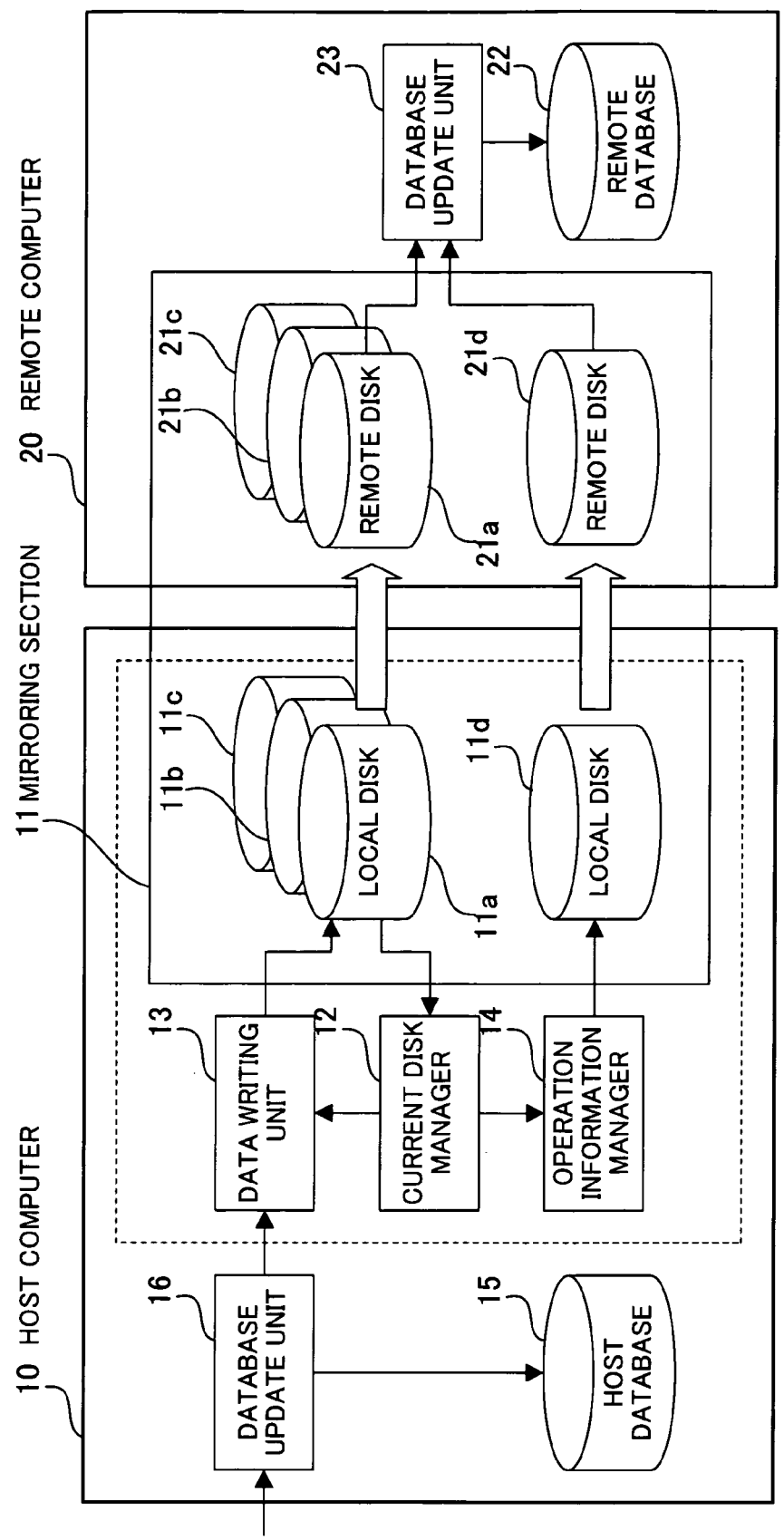
FIG. 1 is a principle view showing the invention that is implemented in one embodiment.

FIG. 1 is a principle view of the invention that is implemented in one embodiment. A database copying system of FIG. 1 comprises a host computer 10 and a remote computer 20, which are connected over a network.

The host computer 10 has local disks 11a, 11b, 11c, and 11d. The remote computer 20 has remote disks 21a, 21b 21c, and 21d corresponding to the local disks 11a, 11b, 11c, and 11d, respectively. In this connection, the local disks 11a, 11b, 11c, and 11d may be independent physical disks or may be logical disks formed by dividing one physical disk into some regions (partitions). The same is true of the remote disks 21a, 21b, 21c, and 21d.

The host computer 10 and the remote computer 20 have a common mirroring section 11. When data is written on a local disk 11a, 11b, 11c, 11d, the mirroring section 11 copies the data on the corresponding remote disk 21a, 21b, 21c, 21d. In this connection, the mirroring section 11 writes the duplicate data on the remote disk 21a, 21b, 21c, 21d in the same sequence as the data was written on the local disk 11a, 11b, 11c, 11d. That is to say, the mirroring section 11 performs a mirroring process guaranteeing a same sequence of writes between the local disks 11a, 11b, 11c, and 11d and the remote disks 21a, 21b, 21c, and 21d.

The host computer 10 further has a current disk manager 12, a data writing unit 13, an operation information manager 14, a host database 15, and a database update unit 16.

The current disk manager 12 selects local disks 11a, 11b, and 11c as disks usable for storing update data and selects one (for example, local disk 11a) of them as a current disk. The current disk is a disk that is currently used for storing update data. When the data stored in the current disk reaches a preset maximum data capacity, the current disk manager 12 switches the current disk to another local disk having free space as the next current disk. Subsequent update data is stored in the next current disk.

The data writing unit 13 obtains information on a local disk selected as a current disk from the current disk manager 12 when receiving a request for writing data including update data. Then the data writing unit 13 adds the received update data to the local disk serving as the current disk.

The operation information manger 14 selects the local disk 11d as an operation information storage disk for storing operation information. When the data stored in the current disk reaches the preset maximum data capacity, the operation information manager 14 stores operation information in the operation information storage disk, the operation information requesting reflection of the update data stored in the current disk on a database copy in the remote computer.

The host database 15 stores data to be used by unillustrated application programs. The database update unit 16 updates the host database 15 in response to an update request when receiving the update request from an application program. When the update of the host database 15 is completed, the database update unit 16 requests writing of update data that is information on the executed update process, to the data writing unit 13.

The remote computer 20, on the other hand, further has a remote database 22 and a database update unit 23. The remote database 22 stores a duplicate of the data stored in the host database 15.

The database update unit 23 always monitors the remote disk 21d corresponding to the local disk 11d that is selected as an operation information storage disk. When a copy of operation information is made on the remote disk 21d, the database update unit 23 obtains duplicate update data from the remote disk (for example, remote disk 21a) corresponding to the local disk (for example, local disk 11a) that is full of data, based on the operation information. Then the database update unit 23 updates the remote database 22 based on the obtained update data, thereby reflecting the update data.

In such a database copying system, when an update request for data is issued from an application program, the database update unit 16 updates the host database 15 and creates update data. The data writing unit 13 stores the created update data in a current disk. When the data stored in the current disk reaches a preset maximum data capacity, the operation information manager 14 stores operation information in an operation information storage disk. The mirroring section 11 copies the update data and the operation information in the remote computer 20 in the same sequence as the data and the information were written. When the operation information is copied, the database update unit 23 obtains the update data from a corresponding remote disk and updates the remote database 22.

This system guarantees an appropriate arrival order in which a duplicate of update data and then a duplicate of operation information arrive. Therefore, the host computer does not necessarily confirm the arrival of the duplicate update data at the remote computer, which allows the host computer to issue a response of processing completion to the application program when the update data is stored in a local disk.

Figure 2:
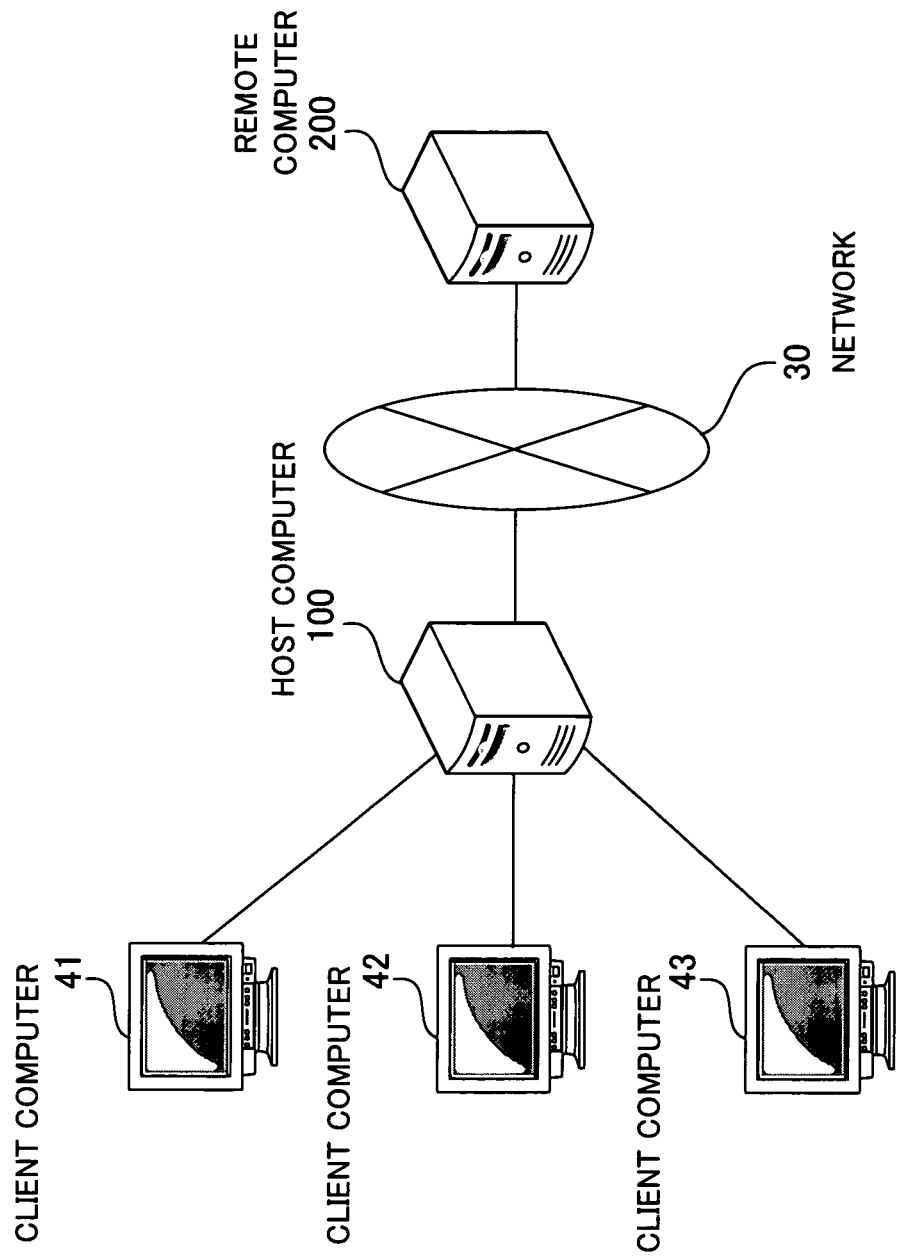
FIG. 2 shows a system configuration of the embodiment.

FIG. 2 shows a system configuration of this embodiment.

A host computer 100 is connected to a remote computer 200 over a network 30, and is also connected to client computers 41, 42, and 43.

The host computer 100 has a host database. In each client computer 41, 42 43, application programs for data processing are installed. Each application program communicates with the host computer 100, when necessary, to request various processes, such as searching for and updating data contained in the host database. The host computer 100 processes the host database in response to requests from the application programs.

The remote computer 200 has a remote database that is a duplicate of the host database. When the host database is updated, the host computer 100 transmits update data to the remote computer 200 over the network 30. The remote computer 200 updates the remote database based on the update data.

The hardware configurations of the host computer 100, the remote computer 200; and the client computers 41, 42, and 43 will be now described. Since these computers can have the same hardware configuration, the following description is made for the host computer 100 by way of an example.

Figure 3:
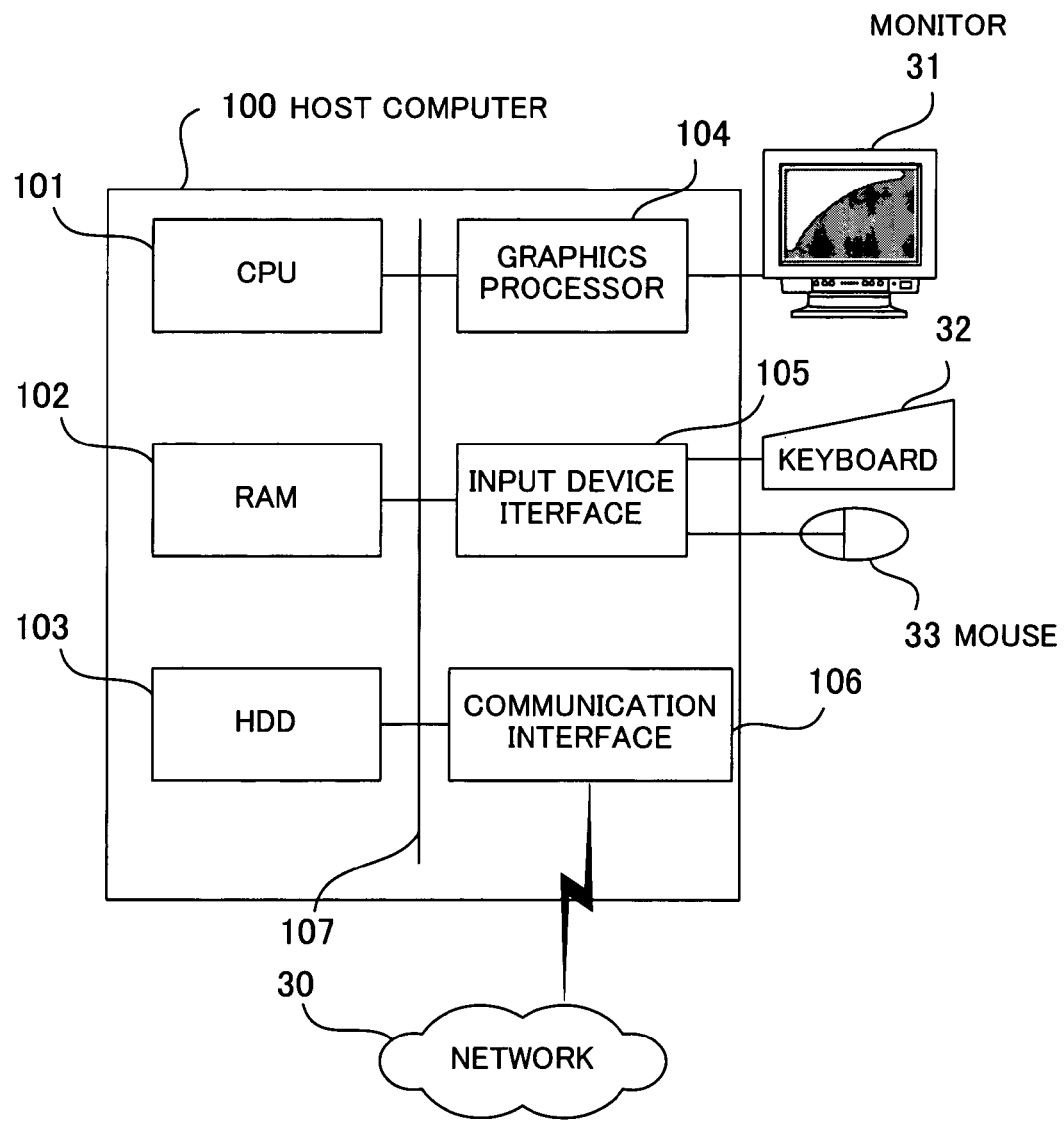
FIG. 3 shows a hardware configuration of a host computer.

FIG. 3 shows a hardware configuration of the host computer. The host computer 100 is entirely controlled by a Central Processing Unit (CPU) 101. Connected to the CPU 101 via a bus 107 are a Random Access Memory (RAM) 102, a Hard Disk Drive (HDD) 103, a graphics processor 104, an input device interface 105, and a communication interface 106.

The RAM 102 temporarily stores at least part of an Operating System (OS) program and application programs to be executed by the CPU 101. The RAM 102 also stores various data for CPU processing. The HDD 103 stores the OS program and the application programs. The graphics processor 104 is connected to a monitor 31 to display images on the monitor 31 under the control of the CPU 101. The input device interface 105 is connected to a keyboard 32 and a mouse 33 and is designed to transfer signals from the keyboard 32 and the mouse 33 to the CPU 101 via the bus 107. The communication interface 106 is connected to the network 30.

Such the hardware configuration realizes the processing functions of this embodiment.

A module configuration of the host computer 100 will be now described.

Figure 4:
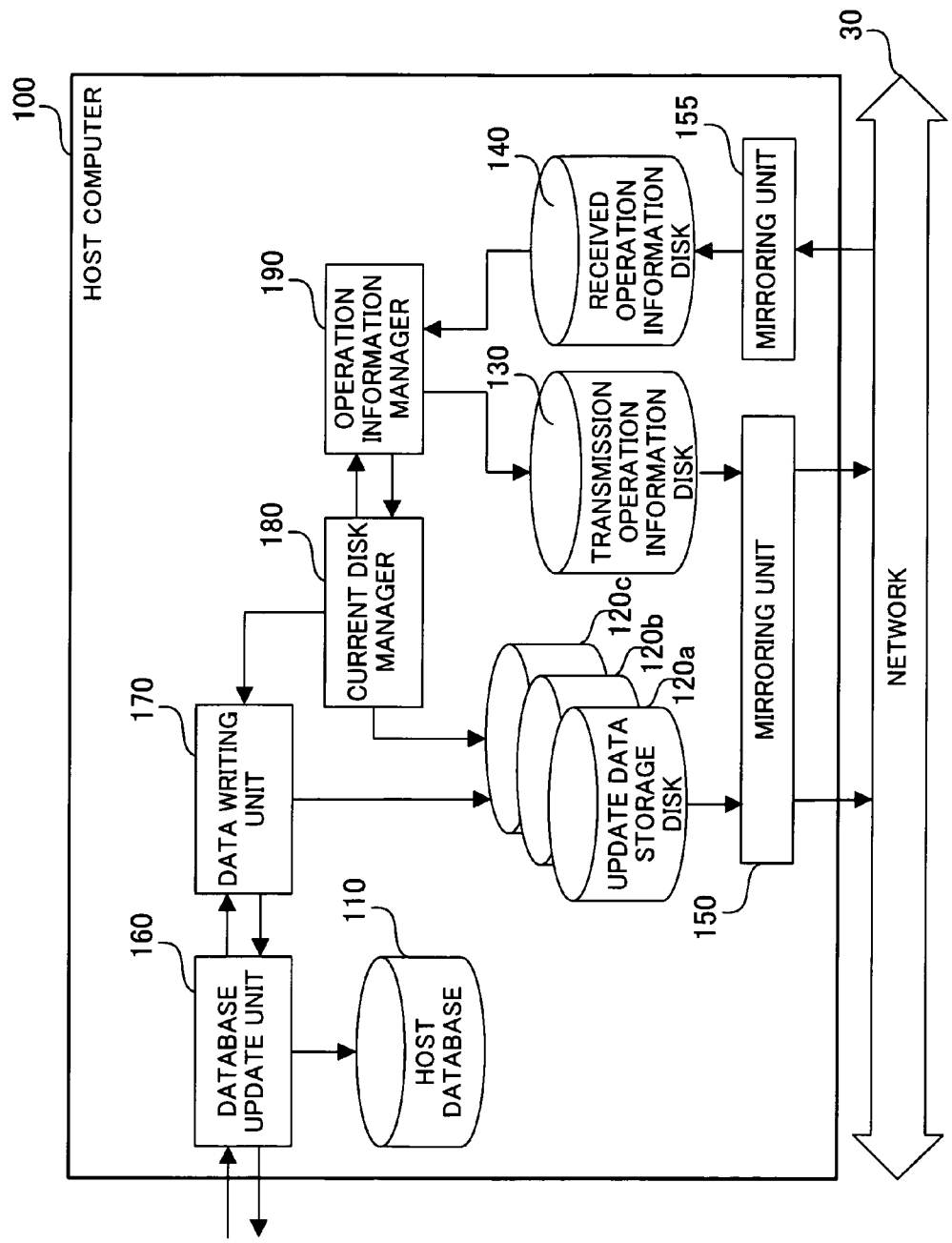
FIG. 4 is a functional block diagram of the host computer.

FIG. 4 is a functional block diagram of the host computer. The host computer 100 has a host database 110, update data storage disks 120a, 120b, and 120c, a transmission operation information disk 130, a received operation information disk 140, mirroring units 150 and 155, a database update unit 160, a data writing unit 170, a current disk manager 180, and an operation information manger 190. The mirroring units 150 and 155 are capable of communicating with the remote computer 200 over the network 30.

The host database 110 stores data to be used by application programs installed in the client computers 41, 42, and 43. The update data storage disks 120a, 120b, and 120c store update data that is information on an update process executed on the host database 110. Each update data storage disk 120a, 120b, 120c has a preset maximum data capacity.

The transmission operation information disk 130 stores operation information indicating the data storage states of the update data storage disks 120a, 120b, and 120c. The received operation information disk 140 stores operation information, similarly to the transmission operation information disk 130. It should be noted that the received operation information disk 140 is a disk for storing a duplicate of operation information written on a corresponding disk of the remote computer 200.

The mirroring unit 150 always monitors whether data has been updated in the update data storage disk 120a, 120b, 120c or the transmission operation information disk 130. When the mirroring unit 150 determines that data has been updated in any of these disks, it transmits the data to the remote computer 200. In a case where data has been updated in the update data storage disks 120a, 120b, 120c and the transmission operation information disk 130 a plural number of times, copies are made on the corresponding disks of the remote computer 200 in the same sequence as the data was updated. A method for guaranteeing a sequence of data writes between disks will be described later.

When the mirroring unit 155 receives operation information from the remote computer 200, it stores the received operation information in the received operation information disk 140. Writes of operation information on the received operation information disk 140 are performed independently of the other mirroring process, its sequence of writes is not guaranteed.

The database update unit 160 receives a data update request from an application program running on a client computer 41, 42, 43. The database update unit 160 updates data stored in the host database 110 in response to the received update request. Then the database update unit 160 creates update data based on the executed update process. When the data writing unit 170 completes the storage of the update data, the database update unit 160 returns a response of processing completion to the application program requesting the update.

The data writing unit 170 queries the current disk manager 180 to specify an in-use disk out of the update data storage disks 120a, 120b, and 120c. Then the data writing unit 170 adds the update data created by the database update unit 160 to the specified update data storage disk.

The current disk manager 180 keeps the disk name of an in-use disk out of the update data storage disks 120a, 120b, and 120c. The current disk manager 180 always monitors the in-use update data storage disk to determine whether the stored update data reaches the maximum data capacity. When yes, the current disk manager 180 queries the operation information manager 190 to obtain the disk name of an update data storage disk to be used next.

The operation information manager 190 specifies an update data storage disk usable next based on the operation information stored in the received operation information disk 140. In addition, the operation information manager 190 stores operation information indicating that the in-use disk is full of data and has been switched to a new disk, in the transmission operation information disk 130.

A module configuration of the remote computer 200 will be now described.

Figure 5:
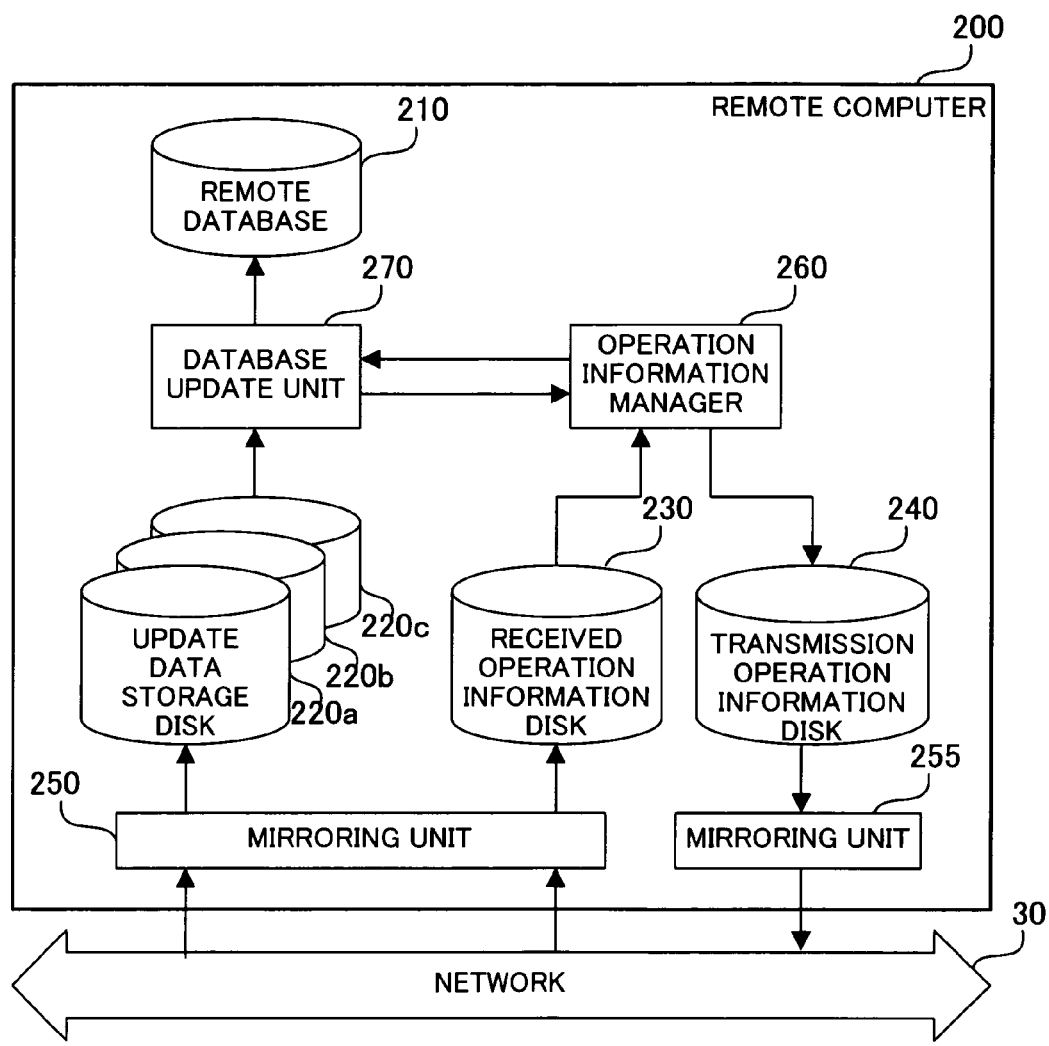
FIG. 5 is a functional block diagram of a remote computer.

FIG. 5 shows the functional block diagram of the remote computer. The remote computer 200 has a remote database 210, update data storage disks 220a, 220b, and 220c, a received operation information disk 230, a transmission operation information disk 240, mirroring units 250 and 255, an operation information manager 260, and a database update unit 270. The mirroring units 250 and 255 are capable of communicating with the host computer 100 via the network 30.

The remote database 210 stores a duplicate of data stored in the host database 110. The update data storage disks 220a, 220b, and 220c store duplicates of update data stored in the update data storage disks 120a, 120b, and 120c, respectively. The received operation information disk 230 stores a duplicate of operation information stored in the transmission operation information disk 130 of the host computer 100. The transmission operation information disk 240 stores operation information indicating whether update data stored in the update data storage disk 220a, 220b, and 220c has been reflected on the remote database 210.

The mirroring unit 250 obtains updated data from the mirroring unit 150 of the host computer 100 and stores the obtained data in a corresponding disk. The mirroring unit 250 operates in cooperation with the mirroring unit 150 of the host computer 100 so as to update the disks in the remote computer 200 in the same sequence as disks were updated in the host computer 100.

As a method for guaranteeing a sequence of data writes between disks, a remote data copying method disclosed in Japanese Unexamined Patent Publication No. 2003-167684 is well known. If this method is applied to this embodiment, a sequence of writes can be guaranteed in the following technique.

Two buffers for temporarily storing data are prepared in the mirroring unit 150 of the host computer 100. One of the two buffers is selected as an in-use buffer while the other is selected to an idle buffer. When data is updated in one of the update data storage disks 120a, 120b, and 120c and the transmission operation information disk 130, the mirroring unit 150 creates control information indicating where the data has been updated. The control information includes a disk name, a start address in the disk, and a data length, for example. The mirroring unit 150 adds the updated data together with the control information to the last of the in-use buffer. When the buffer becomes full of data or when a prescribed time has passed after data was first added to the buffer, the mirroring unit 150 switches the in-use buffer to the other buffer that has been idle. Then the mirroring unit 150 transmits a plurality of data stored in the buffer that is now idle, to the mirroring unit 250 altogether. By alternatively using the two buffers in this way, a contention problem between adding of data to a buffer and reading of data from the buffer can be avoided.

On the other hand, one buffer for temporarily storing data is prepared in the mirroring unit 250 of the remote computer 200. When the mirroring unit 250 receives data from the mirroring unit 150, it stores the received data in the buffer. Then the mirroring unit 250 reads data from the head of the buffer one by one, and stores the data in the place specified by control information. This enables guaranteeing the storage of data in disks in the same sequence as the data was stored in the buffer.

The above method enables guaranteeing a sequence of writes between disks. Alternatively, a remote copying method disclosed in Japanese Patent Unexampled Publication No. 2005-078014, which is not a patent application of this applicant, can realize this guarantee as well.

The mirroring unit 255 always monitors whether operation information has been updated in the transmission operation information disk 240. When operation information is updated, the mirroring unit 255 transmits the updated operation information to the mirroring unit 155. The mirroring process for the transmission operation information disk 240 is performed independently of the other mirroring process and its sequence is not guaranteed. This mirroring process is realized with a method that is generally known as remote mirroring.

The operation information manager 260 always monitors whether operation information has been updated in the received operation information disk 230. When operation information is updated, the operation information manager 260 specifies an update data storage disk specified by the updated operation information. Then when the update data in the specified update data storage disk is reflected on the remote database 210, the operation information manager 260 stores operation information indicating that the update data can be deleted from the update data storage disk, in the transmission operation information disk 240.

The database update unit 270 obtains the update data from the update data storage disk specified by the operation information manager 260. The database update unit 270 updates the remote database 210 based on the obtained update data, thereby reflecting the update data.

The transmission operation information disk 130 has an operation information table 130a showing a list of operation information. Similarly, the received operation information disks 140 has an operation information table 140a, the received operation information disk 230 has an operation information table 230a, and the transmission operation information disk 240 has an operation information table 240a. These operation information tables 130a, 140a, 230a, and 240a have the same data structure, the data structure of the operation information table 130a will be described as an example.

FIG. 6 shows the data structure of the operation information table. The operation information table 130a contains operation information on update data storage disks in a tabular form. The operation information table 130a has a field 131 for an order of use, a field 132 for disk name, and a field 133 for states. Operation information comprises information arranged in a row over the fields in association with each other The field 131 shows an order of use among the update data storage disks 120a, 120b, and 120c. If a disk with an order of use of "1" is in use, a disk with an order of use of "2" is to be used next. Then, a disk with an order of use of "1" is used again after a disk with the last order (for example, a disk with an order of use of "3" in FIG. 6).

The field 132 shows disk names identifying update data storage disks 120a, 120b, and 120c. Assume now that for the update data storage disks 220a, 220b and 220c, the disk names of the corresponding update data storage disks 120a, 120b and 120c are set. That is to say, the update data storage disk 120a and the update data storage disk 220a, the update data storage disk 120b and the update data storage disk 220b, the update data storage disk 120c and the update data storage disk 220c have identical disk names.

The field 133 shows the states of disks, "in-use", "full", or "free". "In-use" is set for a disk that is currently specified for adding thereto update data by the host computer 100. "Full" is set for a disk the update data of which reaches the maximum data capacity but has not been reflected on the remote database 210. "Free" is set for a disk that has not been used yet, or the update data of which has been reflected on the remote database 210 already.

In operation information, an order of use and disk name are previously registered by the operator of the host computer 100. For example, with respect to the update data storage disk 120a (and its corresponding update data storage disk 220a), an order of use of "1" and a disk name of "RLC1" are previously registered as operation information. In the initial setting, operation information shows a state of "free".

Processes to be executed in a system having such a configuration will be now described in detail. A process in the host computer 100 will be first described.

Figure 7:
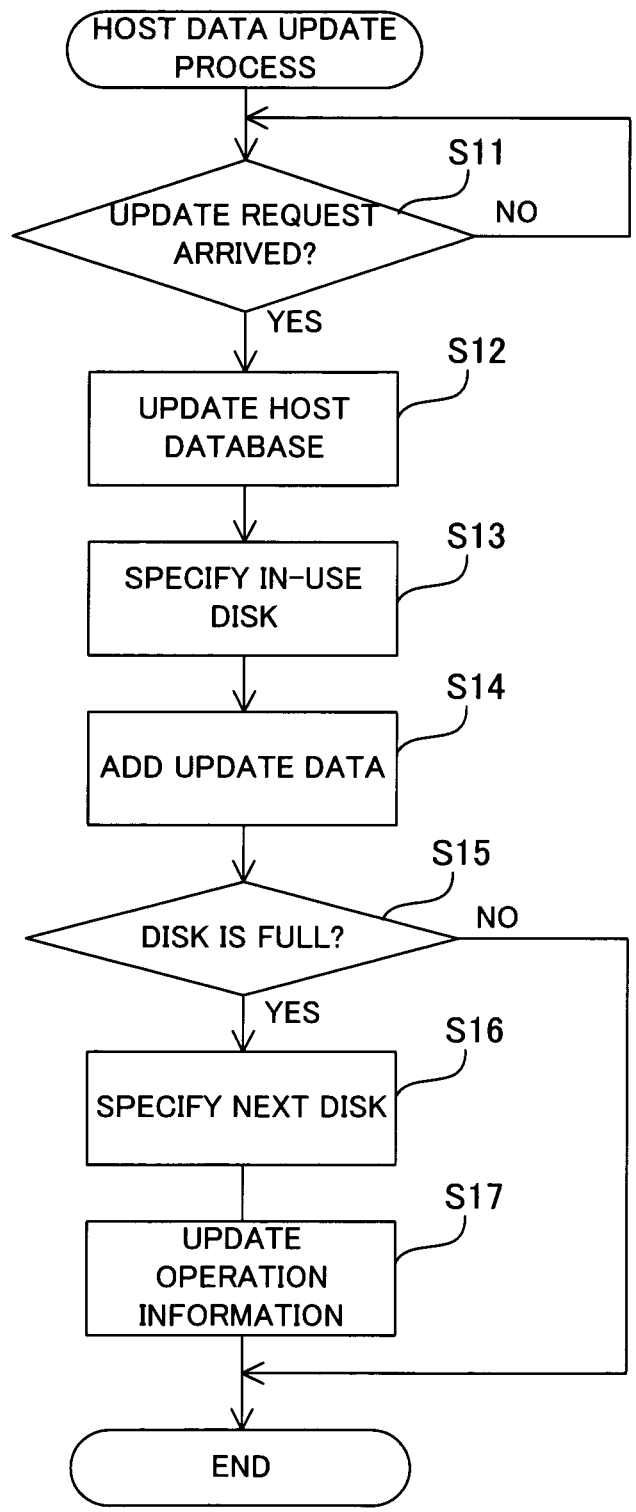
FIG. 7 is a flowchart showing how to update host data.

FIG. 7 is a flowchart showing how to update host data. This flowchart will be described step by step.

[Step S11] The database update unit 160 determines whether an update request has arrived from an application program running on a client computer 41, 42, 43. When an update request has arrived, the process goes on to step S12. Otherwise the database update unit 160 waits for an update request at this step S11.

[Step S12] The database update unit 160 updates data stored in the host database 110 based on the update request received at step S11. Then the database update unit 160 creates update data that is information on the executed update process and gives a writing request including the created update data to the data writing unit 170.

[Step S13] When the data writing unit 170 receives the update data from the database update unit 160, it queries the current disk manager 180 to obtain the name of the in-use update data storage disk.

[Step S14] The data writing unit 170 adds the update data received at step S13 to the update data storage disk specified by the disk name obtained at step S13. Then the data writing unit 170 notifies the database update unit 160 that the update data has been added. The database update unit 160 receiving this notification returns a process completion notification to the source sending the update request received at step S11.

[Step S15] The current disk manager 180 always monitors the in-use disk out of the update data storage disks 120a, 120b and 120c to determine whether the update data stored in the monitored update data storage disk reaches the maximum data capacity. When yes, the process goes on to step S16. Otherwise this host data update process is completed.

[Step S16] The current disk manager 180 notifies the operation information manager 190 of the disk name of the in-use update data storage disk. The operation information manager 190 receiving this notification searches the operation information table 140a stored in the received operation information disk 140, for operation information of an update data storage disk that is to be used after the update data storage disk specified by the received disk name. If the detected operation information shows a state other than "free", then the operation information manger 190 detects the operation information of an update data storage disk that is to be used after that, and extracts the disk name from the detected operation information.

[Step S17] The operation information manager 190 searches the operation information table 130a stored in the transmission operation information disk 130, for the operation information including the disk name of the update data storage disk received from the current disk manager 180 at step S16. Then the operation information manager 190 changes the state of the obtained operation information to "full", thereby updating the operation information table 130a. In addition, the operation information manager 190 searches the operation information table 130a for the operation information including the disk name extracted at step S16. Then the operation information manager 190 changes the state of the obtained operation information to "in-use", thereby updating the operation information table 130a. Then the operation information manager 190 notifies the current disk manager 180 of the disk name extracted at step S16. The current disk manager 180 receiving this notification determines that the update data storage disk specified by the received disk name can be currently used.

As described above, when an update request arrives from an application program, the database update unit 160 updates the host database 110. Then the data writing unit 170 adds update data in an in-use update data storage disk. At this time, a response is returned to the application program sending the update request. When the in-use update data storage disk becomes full, the operation information manager 190 specifies and switches to an update data storage disk to be used next.

It is now assumed that the update data storage disk 120a is "in-use" and the update data storage disk 120b is "free". If the data writing unit 170 adds update data and thereby the update data stored in the update data storage disk 120a reaches the maximum data capacity, the state of the update data storage disk 120a is changed from "in-use" to "full". In addition, the state of the update data storage disk 120b is changed from "free" to "in-use".

A process in the remote computer 200 will be now described.

Figure 8:
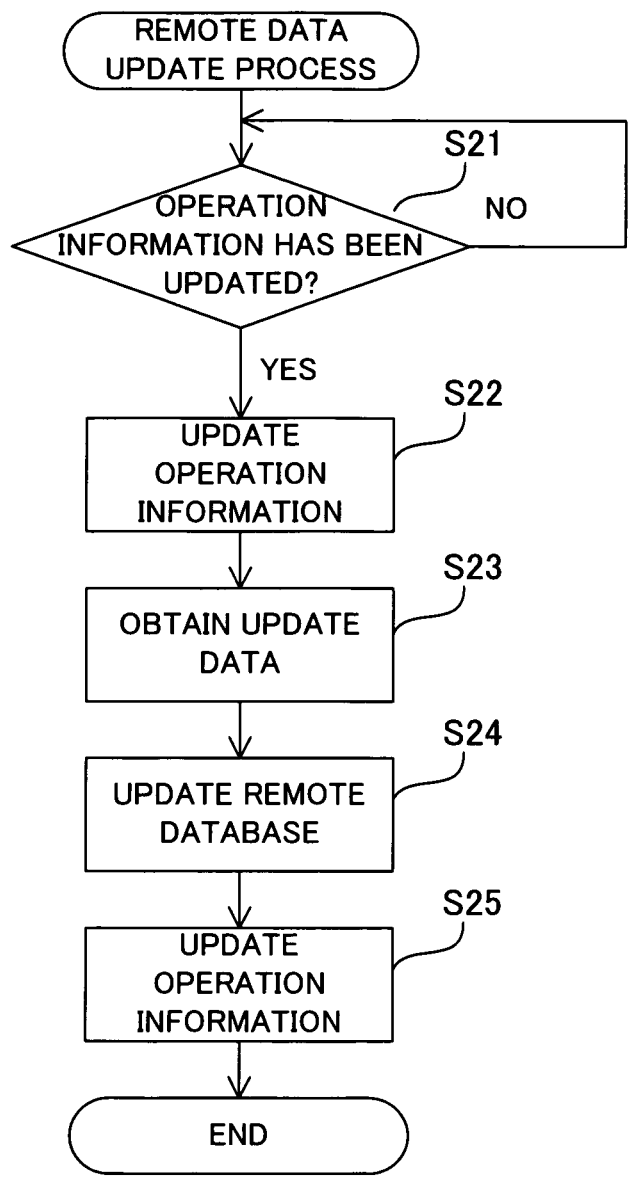
FIG. 8 is a flowchart showing how to update remote data.

FIG. 8 is a flowchart showing how to update remote data. This flowchart will be described step by step.

[Step S21] The operation information manager 260 always monitors the operation information table 230a stored in the received operation information disk 230, to detect whether operation information has been updated so that its state is changed from "in-use" to "full". When operation information is updated, the process goes on to step S22. Otherwise the operation information manager 260 waits operation information to be updated at this step S21.

[Step S22] The operation information manager 260 obtains updated operation information from the operation information table 230a. Then the operation information manager 260 updates the operation information table 240a stored in the transmission operation information disk 240 based on the obtained operation information to thereby reflect the update. As a result, the operation information table 230a has the same data as the operation information table 240a. Then the operation information manger 260 extracts the disk name from the obtained operation information and notifies the database update unit 270 of the extracted disk name.

[Step S23] When the database update unit 270 receives the disk name from the operation information manger 260, it obtains all update data from the update data storage disk specified by the received disk name.

[Step S24] The database update unit 270 updates the remote database 210 based on the update data obtained at step S23, thereby reflecting the update data on the remote database 210. Then the database update unit 270 notifies the operation information manager 260 of the completion of the update process.

[Step S25] When the operation information manager 260 receives the notification from the database update unit 270, it searches the operation information table 240a stored in the transmission operation information disk 240 for the operation information including the disk name extracted at step S22. The operation information manager 260 then changes the state of the obtained operation information from "full" to "free", thereby updating the operation information table 240a.

As described above, when the state of the operation information of one update data storage disk is changed from "in-use" to "full", the operation information manager 260 specifies the full update data storage disk. Then the database update unit 270 obtains the update data from the specified update data storage disk and updates the remote database 210. Then the operation information manger 260 changes the state of the operation information from "full" to "free".

It is now assumed that the state of the update data storage disk 120a is changed from "in-use" to "full". In this case, the remote database 210 is updated based on the update data stored in the update data storage disk 220a corresponding to the update data storage disk 120a. Then the state of the operation information of the update data storage disk 120a (and the corresponding update data storage disk 220a) is changed from "full" to "free".

Next explanation is about how the mirroring units 150, 155, 250, and 255 execute the mirroring process between disks in the above-described host data update process and remote data update process.

Figure 9:
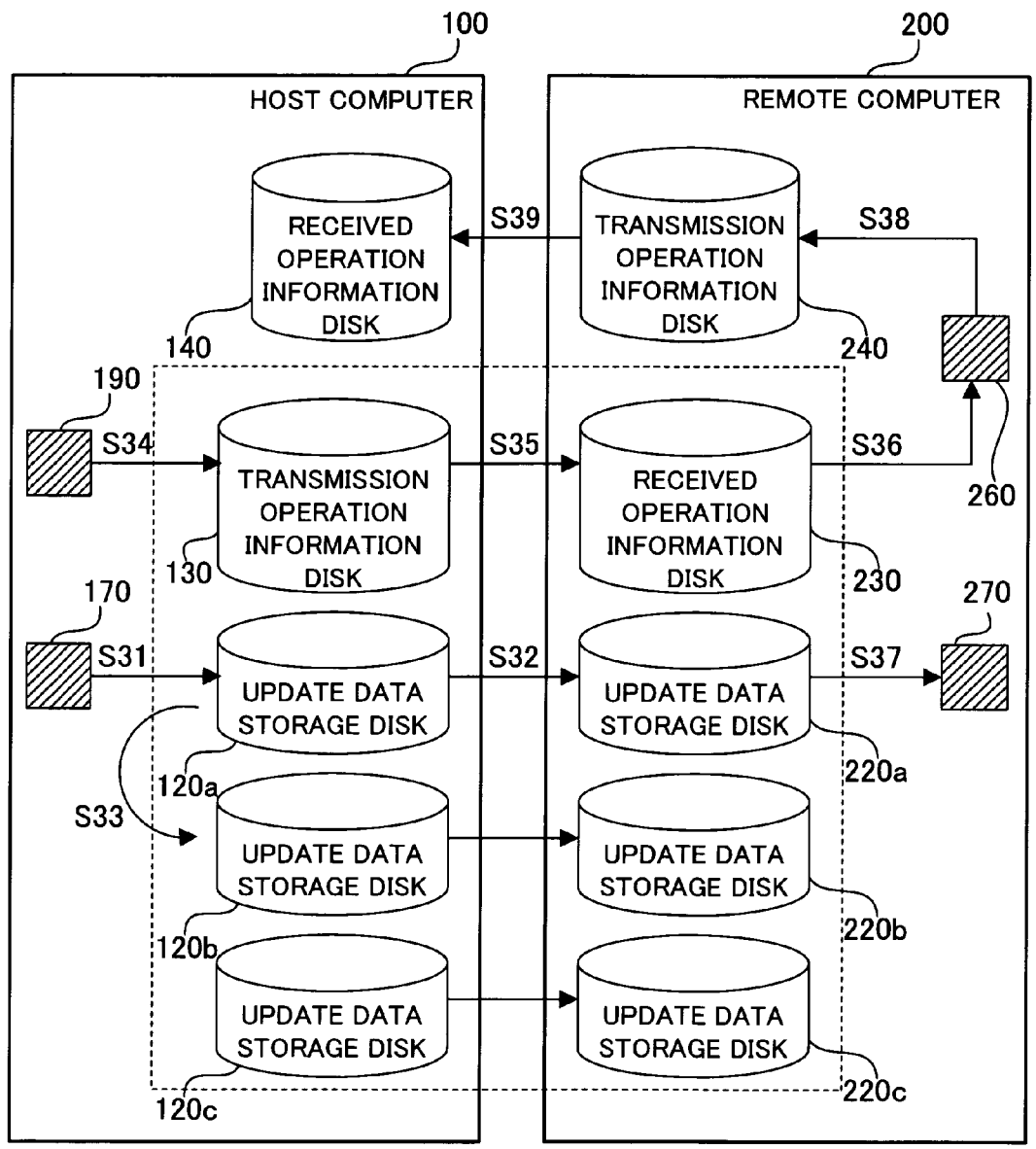
FIG. 9 shows an example of a mirroring process between disks.

FIG. 9 shows how to execute the mirroring process between disks. Elements other than disks to be used in this mirroring process are omitted or simply illustrated. Data stored in the update data storage disks 120a, 120b, and 120c and transmission operation information disk 130 are copied on the corresponding update data storage disks 220a, 220b and 220c and received operation information disk 230 in the same sequence as the data was written. Independently of this, data stored in the transmission operation information disk 240 is copied on the received operation information disk 140. The processing flow of FIG. 9 will be described step by step.

[Step S31] The data writing unit 170 adds update data to an in-use update data storage disk (for example, the update data storage disk 120a).

[Step S32] The mirroring unit 150 and the mirroring unit 250 make a copy of the update data added at step S31 on a corresponding update data storage disk (for example, update data storage disk 220a). This copying process is performed within a prescribed delay time from the update data is added to the update data storage disk 120a.

[Step S33] If the in-use update data storage disk becomes full, the operation information manager 190 specifies an update data storage disk usable next (for example, the update data storage disk 120b), and thereby switches the full disk to the next disk for storing update data.

[Step S34] The operation information manager 190 updates operation information stored in the transmission operation information disk 130 by changing the state of the update data storage disk that became full at step S33, to "full".

[Step S35] The mirroring unit 150 and the mirroring unit 250 make a copy of the operation information updated at step S34 on the received operation information disk 230. Such a sequence is guaranteed that the update data is copied on the update data storage disk of the remote computer 200 at step S32 and then the operation information is copied on the received operation information disk 230.

[Step S36] The operation information manager 260 monitors the received operation information disk 230 to obtain the updated operation information.

[Step S37] The database update unit 270 obtains the update data from the update data storage disk (for example, the update data storage disk 220a) specified by the operation information obtained at step S36, and updates the remote database 210.

[Step S38] The operation information manager 260 updates the operation information stored in the transmission operation information disk 240 by changing the state of the update data storage disk of the update information obtained at step S37 to "free".

[Step S39] The mirroring unit 155 and the mirroring unit 255 make a copy of the operation information updated at step S38 on the received operation information disk 140.

As described above, update data stored in the update data storage disks 120a, 120b and 120c is copied on the corresponding update data storage disks 220a, 220b and 220c of the remote computer 200. When an in-use update data storage disk becomes full, the host computer 100 transmits operation information indicating this matter to the remote computer 200. The remote computer 200 obtains the update data from a corresponding update data storage disk 220a, 220b, 220c based on the obtained operation information, and reflects the update data on the remote database 210. When the update of the remote database 210 is completed, the remote computer 200 transmits operation information indicating this matter to the host computer 100. The host computer 100 deletes the update data based on the obtained operation information and thus the update data storage disk becomes reusable.

In accordance with this database copying system, data stored in the host database 110 is copied on the remote database 210. A sequence of copying update data and operation information is maintained, so that complete update data exists in a disk of the remote computer 200 by the time when the remote computer 200 receives the operation information. Therefore, the host computer 100 can reply to an application program without waiting for arrival of a notification of update data reception from the remote computer 200. Then if the host computer 100 fails, data can be recovered based on the data stored in the remote database 210 and the update data that has not been reflected on the remote database 210.

The processing functions described above can be realized by a general computer. In this case, a program is prepared, which describes processes for the functions to be performed by the host computer 100. The program is executed by a computer, whereupon the aforementioned processing functions are accomplished by the computer. The program describing the required processes may be recorded on a computer-readable recording medium. Computer-readable recording media include magnetic recording devices, optical discs, magneto-optical recording media, semiconductor memories, etc. The magnetic recording devices include Hard Disk Drives (HDD), Flexible Disks (FD), magnetic tapes, etc. The optical discs include Digital Versatile Discs (DVD), DVD-Random Access Memories (DVD-RAM), Compact Disc Read-Only Memories (CD-ROM), CD-R (Recordable)/ RW (ReWritable), etc. The magneto-optical recording media include Magneto-Optical disks (MO) etc.

To distribute the program, portable recording media, such as DVDs and CD-ROMs, on which the program is recorded may be put on sale. Alternatively, the program may be stored in the storage device of a server computer and may be transferred from the server computer to other computers through a network.

A computer which is to execute the program stores in its storage device the program recorded on a portable recording medium or transferred from the server computer, for example. Then, the computer runs the program. The computer may run the program directly from the portable recording medium. Also, while receiving the program being transferred from the server computer, the computer may sequentially run this program.

According to this invention, a mirroring unit guaranteeing a sequence of writes is used to copy data and operation information from local disks onto remote disks. At this time, it can be guaranteed that the data is copied on the remote disk and then the operation information arrives at the remote computer. That is to say, the host computer can continue its processing without waiting for copying the data on the remote disk, thus making it possible to offer an improved response speed.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A database copying system for making a copy of a database, the database copying system comprising:
   a first computer comprising:
      a mirroring unit to, when data is written on a plurality of local disks individually, write duplicate data of the data on remote disks in a same sequence as the data was written, the remote disks corresponding to the plurality of local disks, respectively;
      a current disk manager to select a first local disk out of the plurality of local disks as a current disk, and when stored data of the current disk reaches a maximum data capacity, switch the current disk to another local disk;
      a data writing unit to write the data on the current disk when a data writing request arrives;
      an operation information manager to, when the stored data of the current disk reaches the maximum data capacity, store first operation information in a second local disk selected out of the plurality of local disks, the first operation information requesting to update the copy of the database; and
      an operation information receiver to receive second operation information indicating completion of updating the copy of the database,
      wherein the current disk manager forbids the first local disk from being reselected as the current disk from the time when the current disk is switched to the other local disk to the time when the second operation information is received, and allows the first local disk to be reselected as the current disk after the second operation information is received; and
   a second computer comprising:
      a database update unit to, when the first operation information is copied from the second local disk to a second remote disk corresponding to the second local disk, update the copy of the database based on the duplicate data stored in a first remote disk corresponding to the first local disk; and
      a transmitter to transmit the second operation information to the first computer after updating the copy of the database is completed.

2. The database copying system according to claim 1, the first computer further comprising:
   an update unit to execute an update process of the database when an update request specifying a way for updating the database arrives and
   output the data writing request of an update log for the executed update process.

3. A database copying method for, when data is written on a plurality of local disks individually, writing duplicate data of the data on remote disks in a same sequence as the data was written, the plurality of local disks provided in a first computer, the remote disks provided in a second computer to correspond to the plurality of local disks, respectively, the method comprising:
   selecting a first local disk out of the plurality of local disks as a current disk;
   writing the data on the current disk when a data writing request is received;
   switching the current disk to another local disk when stored data of the current disk having the data written thereon reaches a maximum data capacity;
   storing first operation information in a second local disk selected out of the plurality of local disks when the stored data of the current disk having the data written thereon reaches the maximum data capacity, the first operation information requesting to update a copy of a database provided in the second computer;
   updating, when the first operation information is copied from the second local disk to a second remote disk corresponding to the second local disk, the copy of the database based on the duplicate data stored in a first remote disk corresponding to the first local disk;
   transmitting, from the second computer to the first computer, second operation information indicating completion of updating the copy of the database after updating of the copy of the database is completed; and
   receiving the second operation information transmitted from the remote computer, wherein:
   the first local disk is forbidden from being reselected as the current disk from the time when the current disk is switched to the other local disk to the time when the second operation information is received; and
   the first local disk is allowed to be reselected as the current disk after the second operation information is received.

4. A database copying method for copying data from a first computer to a second computer through a network and making a copy of a database on the second computer, the method comprising:
   selecting from a plurality of local disks provided in the first computer one local disk as a current disk and another local disk as an operation information storage disk, the plurality of local disks corresponding to a plurality of remote disks provided in the second computer, respectively;
   writing the data on the current disk when a data writing request arrives;

copying the data from the current disk to one remote disk corresponding to the current disk through the network in a same sequence as the data was written on the current disk;

switching the current disk to some other local disk when stored data of the current disk reaches a maximum data capacity;

writing operation information on the operation information storage disk when the stored data of the current disk reaches the maximum data capacity, the operation information indicating a local disk of which the stored data reaches the maximum data capacity among the plurality of local disks;

copying, after completion of copying the stored data of the current disk to the one remote disk, the operation information from the operation information storage disk to another remote disk corresponding to the operation information storage disk through the network;

obtaining, when the operation information is copied to the other remote disk and the operation information indicates the one local disk, the data from the one remote disk corresponding to the one local disk indicated by the operation information; and updating the copy of the database provided in the second computer based on the data obtained from the one remote disk.

* * * * *